US012119602B2

(12) United States Patent
Berghahn et al.

(10) Patent No.: US 12,119,602 B2
(45) Date of Patent: Oct. 15, 2024

(54) TERMINAL

(71) Applicant: Phoenix Contact GmbH & Co. KG, Blomberg (DE)

(72) Inventors: Kevin Berghahn, Blomberg (DE); Martin Gebhardt, Porta Westfalica (DE); Ralph Hoppmann, Bad Oeynhausen (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 114 days.

(21) Appl. No.: 17/436,115

(22) PCT Filed: Mar. 6, 2020

(86) PCT No.: PCT/EP2020/055968

§ 371 (c)(1),
(2) Date: Sep. 3, 2021

(87) PCT Pub. No.: WO2020/182639

PCT Pub. Date: Sep. 17, 2020

(65) Prior Publication Data

US 2022/0166151 A1 May 26, 2022

(30) Foreign Application Priority Data

Mar. 13, 2019 (DE) ..................... 10 2019 106 350.7

(51) Int. Cl.
*H01R 4/48* (2006.01)

(52) U.S. Cl.
CPC ................................ *H01R 4/48365* (2023.08)

(58) Field of Classification Search
None
See application file for complete search history.

(56) References Cited

U.S. PATENT DOCUMENTS 9,466,911 B1 * 10/2016 Wu ...................... H01R 13/514
10,033,119 B2 * 7/2018 Koellmann .............. H01R 4/52
(Continued)

FOREIGN PATENT DOCUMENTS

DE 1590086 A1 6/1970
DE 8228403 U1 1/1983
(Continued)

*Primary Examiner* — Ross N Gushi
(74) *Attorney, Agent, or Firm* — LEYDIG, VOIT & MAYER, LTD.

(57) ABSTRACT

A terminal for connecting an electrical conductor includes a housing, a current bar arranged in the housing, a clamping spring arranged in the housing for clamping the conductor to be connected against the current bar in a conductor connection space formed between the current bar and the clamping spring, and an actuation element, which is displaceably mounted in the housing, wherein a clamping leg of the clamping spring can be actuated by means of the actuation element in order to transfer the clamping leg from a clamping position into an open position. The clamping leg has at least one skid, which with at least one pressure face formed on the actuation element, interacts during transfer of the clamping leg from the clamping position into the open position in such a way that the clamping leg slides along the at least one pressure face with the at least one skid.

10 Claims, 4 Drawing Sheets

(56) References Cited

U.S. PATENT DOCUMENTS

| | | | | |
|---|---|---|---|---|
| 10,461,444 | B2 * | 10/2019 | Scanzillo | H01R 4/48365 |
| 11,239,575 | B2 * | 2/2022 | Koellmann | H01R 9/2675 |
| 2007/0072481 | A1 | 3/2007 | Edenharter | |
| 2011/0223795 | A1 | 9/2011 | Schafmeister | |
| 2019/0245281 | A1 * | 8/2019 | Sonderer | H01R 4/4836 |

FOREIGN PATENT DOCUMENTS

| | | | |
|---|---|---|---|
| DE | 102005045596 | B3 | 6/2007 |
| DE | 102008039868 | A1 | 3/2010 |
| DE | 102010025930 | A | 1/2012 |
| JP | S54-50983 | A | 4/1979 |

* cited by examiner

TERMINAL

CROSS-REFERENCE TO PRIOR APPLICATIONS

This application is a U.S. National Phase application under 35 U.S.C. § 371 of International Application No. PCT/EP2020/055968, filed on Mar. 6, 2020, and claims benefit to German Patent Application No. DE 10 2019 106 350.7, filed on Mar. 13, 2019. The International Application was published in German on Sep. 17, 2020 as WO 2020/182639 under PCT Article 21(2).

FIELD

The invention relates to a terminal for connecting an electrical conductor.

BACKGROUND

A terminal may be used for connecting an electrical conductor, and may include an actuation element. The actuation element is usually pin-shaped and presses against a clamping leg of a clamping spring, in order to transfer the clamping leg from the clamping position, in which the clamping leg is clamped against a current bar, into the open position, in which the clamping leg is arranged at a distance from the current bar. The actuation element has a contact point with which the actuation element rests against the clamping leg. During the actuation of the clamping leg by means of the actuation element, the contact point of the actuation element travels along the longitudinal extension of the clamping leg on the surface of the clamping leg. The contact point of the actuation element travels along the surface of the clamping leg from the point initially located relatively far inside, close to the bending joint of the clamping spring, and away from the bending joint to an outer point on the surface of the clamping leg. Accordingly, for releasing a connected, clamped conductor, that is to say for actuating the actuation element and for displacing it in the actuating direction, a relatively high application of force or a high actuating force is necessary, while the applied force at the end of this actuation process is lower due to the contact point of the actuation element on the clamping leg being displaced outwardly on the clamping leg.

SUMMARY

In an embodiment, the present invention provides a terminal for connecting an electrical conductor. The terminal comprises a housing, a current bar arranged in the housing, a clamping spring arranged in the housing for clamping the conductor to be connected against the current bar in a conductor connection space formed between the current bar and the clamping spring, and an actuation element, which is displaceably mounted in the housing, wherein a clamping leg of the clamping spring can be actuated by means of the actuation element in order to transfer the clamping leg from a clamping position into an open position. The clamping leg has at least one skid, which with at least one pressure face formed on the actuation element, interacts during the transfer of the clamping leg from the clamping position into the open position in such a way that the clamping leg slides along the at least one pressure face with the at least one skid.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
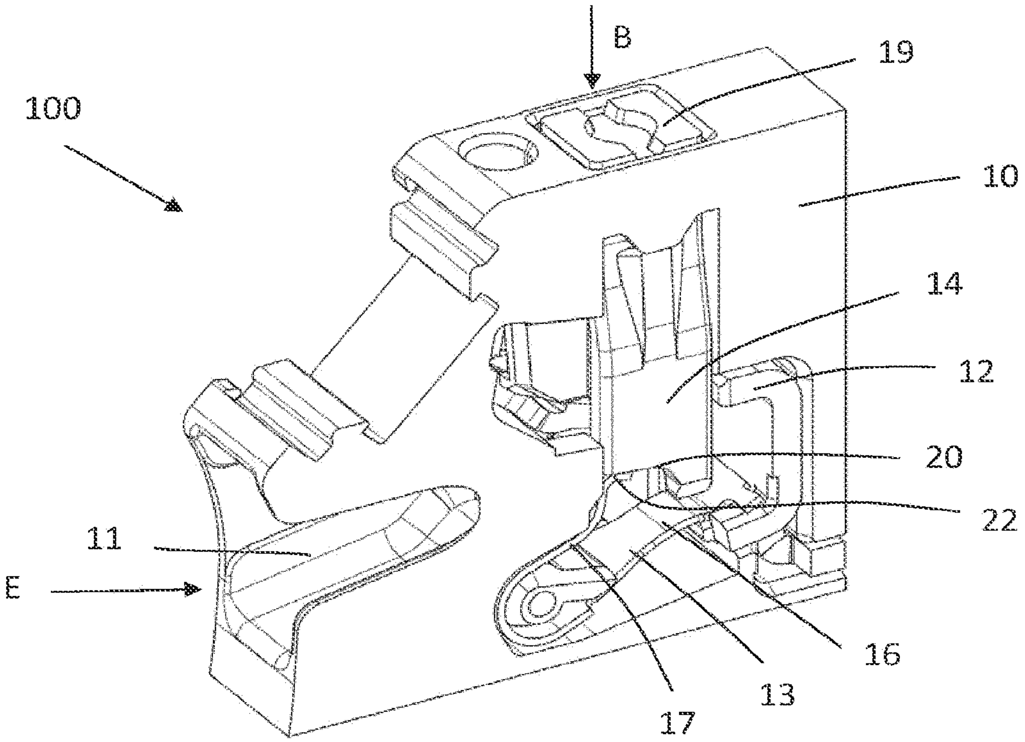
FIG. 1 is a schematic representation of a terminal according to the invention in a clamping position of the clamping leg of the clamping spring.
Figure 2:
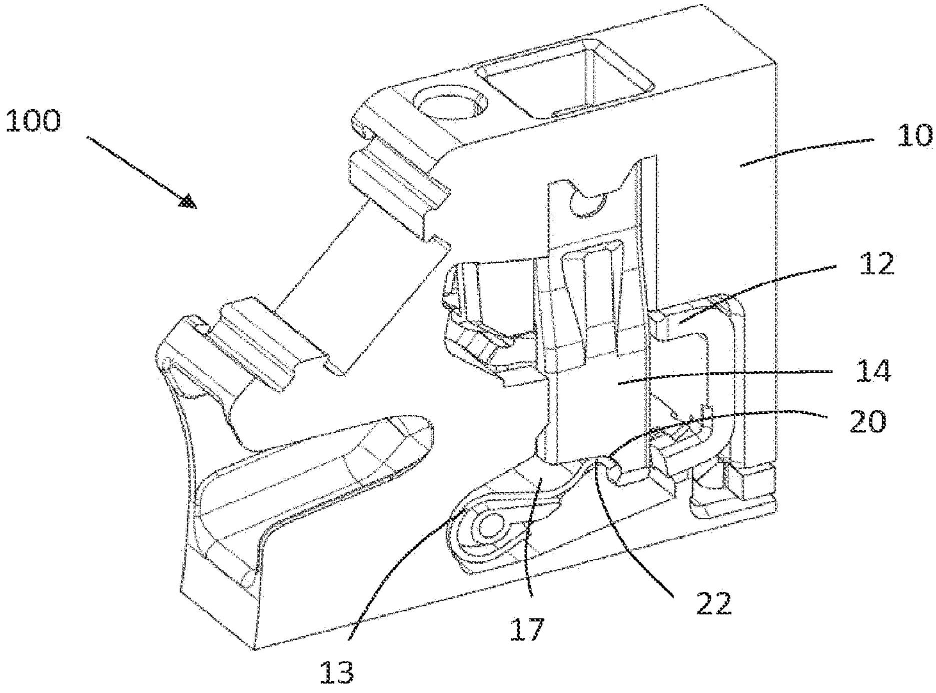
FIG. 2 is a schematic representation of the terminal shown in FIG. 1 with the clamping leg of the clamping spring in an open position.

The present disclosure relates to a terminal for connecting an electrical conductor, and more particularly, a terminal having a housing, a current bar arranged in the housing, a clamping spring arranged in the housing for clamping the conductor to be connected against the current bar in a conductor connection space formed between the current bar and the clamping spring, and having an actuation element, which is displaceably mounted in the housing, wherein a clamping leg of the clamping spring can be actuated by means of the actuation element to transfer the clamping leg from a clamping position into an open position.

An embodiment of the present invention provides a terminal, with which manageability can be improved, particularly in which the force required to actuate the actuation element and thus the actuating force to be applied to the clamping spring by means of the actuation element can be reduced.

The terminal according an embodiment of the present invention is characterized in that the clamping leg has at least one skid which, during the transfer of the clamping leg from the clamping position into the open position, interacts in such a way with at least one pressure face formed on the actuation element that the clamping leg with the at least one skid slides along the at least one pressure face.

According to embodiments of the present invention, the contact point of the actuation element does not travel along the surface of the clamping leg when the clamping spring is actuated, the contact pointdoes not change but remains at a constant position on the clamping leg, in particular on the skid of the clamping leg. It can thus be ensured that the actuation element applies force to the clamping leg at a constant contact point during an actuation process. This contact point is formed by the at least one skid of the clamping leg. As a result, a more uniform application of force during an actuation process and also a lower application of force is already necessary from the beginning of the actuation process, and such a high actuating force is no longer required for initiating the actuation process as is the case with conventional terminals. The skid travels along the pressure face of the actuation element during the actuation process. The pressure face of the actuation element thus represents a type of running contour or sliding or contact contour, which ensures that the actuation element is continuously in contact with the same contact point of the clamping leg, namely with the skid of the clamping leg. The pressure face is preferably formed on an end face of the actuation element directed toward the clamping spring. Handling for a user of the terminal can be improved by the thereby reduced force application for actuating the clamping spring by means of the actuation element.

The pressure face formed on the actuation element preferably has an arcuate shape. During the actuation process, the skid can thus slide along the arcuate shape. As a result of the arcuate shape, the skid can execute a type of rolling movement along the pressure face during the actuation process, so that the clamping leg can execute a pivoting movement, while the actuation element executes a purely linear or purely translational movement during actuation of the clamping leg. The purely linear or purely translational actuating direction of the actuation element is preferably perpendicular to the insertion direction of the conductor to be connected into the housing of the terminal.

The actuation element, in a preferred embodiment, has at least one actuating arm, wherein the at least one actuating arm can delimit the conductor connection space transversely to the insertion direction of the conductor into the conductor connection space, and wherein the at least one pressure face can be formed on a side face of the at least one actuating arm facing the clamping spring. By laterally delimiting the conductor connection space, which is formed between the current bar and the clamping spring and into which the conductor to be connected is inserted, it is possible to prevent incorrect plugging of the conductor during insertion into this conductor connection space, since the actuating arm of the actuation element forms a kind of lateral boundary wall of the conductor connection space. The conductor connection space can thereby be delimited upwardly by the current bar, downwardly by the clamping leg of the clamping spring and laterally by the actuating arm, so that a secure insertion of the conductor into the conductor connection space can be ensured. Even during the clamping process, a lateral deflection of individual strands of the conductor can be prevented by a setting process of the strands of the conductor by the actuating arm. By means of the actuating arm, the actuation element can laterally overlap the current bar and at least the clamping leg of the clamping spring. Even in the non-actuated state of the clamping spring, i.e., when the clamping leg is resting against the current bar, the at least one actuating arm of the actuation element will be projecting beyond the conductor connection space and thus the current bar, so that there is no possibility of the conductor to be connected escaping laterally.

The actuating arm can have a first longitudinal side face, which can be longer than a second longitudinal side face opposite the first longitudinal side face, wherein the at least one pressure face can extend from the first longitudinal side face to the second longitudinal side face. Should one longitudinal side face be longer than the other longitudinal side face of the actuating arm, the actuating arm can form or take the shape of a kind of extension lug in the region of the longer longitudinal side face. The longer longitudinal side face and thus the extension lug is preferably formed on the actuating arm, where the actuating arm laterally projects beyond the clamping edge of the clamping leg. As a result, in particular in the region of the clamping edge, a lateral incorrect insertion of the conductor to be connected can be prevented particularly reliably. Should the pressure face extend from the first longitudinal side face to the second longitudinal side face, the pressure face can then extend over the entire width of the actuating arm, so that the surface along which the skid can travel or slide during the actuation process can be particularly long and the entire width of the actuating arm can be used. This in particular also enables conductors with a large conductor cross-section to be connected.

The at least one skid preferably has an arcuate shape. The skid is thus preferably curved. The skid is preferably arched in the direction of the pressure face. The contact point of the skid on the pressure face of the actuation element is preferably formed at the apex of the curvature or at the apex of the arcuate shape of the skid. As a result of its formation at the apex, the contact point can be formed on the skid in a particularly defined manner.

The clamping leg preferably has a clamping tab and at least one side tab arranged to the side of the clamping tab, wherein a clamping edge for clamping the conductor to be connected against the current bar can be formed on a free end of the clamping tab, and wherein the at least one skid can be formed on the at least one side tab. The skid can thus be formed on a side tab of the clamping leg, which can be arranged separately from the clamping tab on which the clamping edge is formed. The function of actuating the clamping leg by means of the actuation element can thus be separated from the clamping of the conductor to be connected via the clamping tab. The side tab preferably runs parallel to the clamping tab. The side tab preferably forms an outer edge of the clamping leg. A free space is preferably formed between the side tab and the clamping tab, so that the side tab is preferably formed at a distance from the clamping tab.

In relation to the side tab, the clamping tab is preferably designed in such a way that the clamping tab can project beyond the at least one side tab in the longitudinal direction of the clamping leg. The skid can thus be set back in the direction of the bending joint of the clamping spring in relation to the clamping edge of the clamping leg. Due to the set-back arrangement of the at least one side tab and thus of the at least one skid relative to the clamping edge, it can be ensured that, even in the non-actuated state of the clamping spring, when the clamping leg is resting against the current bar, the at least one actuating arm can project laterally beyond the current bar and thus the conductor connection space, so that a lateral deflection of the conductor to be connected can be reliably prevented during insertion into the conductor connection space.

In order to be able to improve the interaction of the actuation element with the clamping spring or with the clamping leg of the clamping spring and to be able to achieve a more even force distribution on the clamping leg of the clamping spring during the actuation process, the clamping leg can have a second skid and the actuation element have a second pressure face, wherein, during the transfer of the clamping leg from the clamping position into the open position, the second skid and the second pressure face can interact in such a way that the clamping leg can slide with the second skid along the second pressure face.

During the actuation process, the actuation element can then apply a force simultaneously with its two pressure faces to the two skids of the clamping leg, so that the two skids can slide symmetrically with respect to one another along the respective pressure face assigned to them on the actuation element. By guiding the actuation element over two pressure faces on two skids, tilting of the actuation element during the actuation process can be prevented, so that a more even guidance of the clamping leg can also be achieved during the actuation process.

The actuation element can then have a second actuating arm on which the second pressure face can be formed on a side face facing the clamping spring, wherein the first actuating arm and the second actuating arm can be arranged opposite each other and can each laterally delimit an opening of the actuation element, through which the current bar can be guided and the conductor to be connected can be guided. Due to the two actuating arms, the actuation element can have a U-shape, wherein an opening within the actuation element can be formed by the two actuating arms arranged at a distance from one another, through which opening the current bar and the conductor to be connected can be guided. The conductor connection space can be formed in the opening, so that the conductor connection space can be delimited on two sides by the actuation element. The two actuating arms can thus prevent lateral incorrect insertion of the conductor to be connected both to the right and to the left. The two actuating arms are preferably designed symmetrically to one another.

The clamping leg can have a second side tab arranged to the side of the clamping tab, wherein the second skid can be formed on the second side tab, wherein the clamping tab can be arranged between the first side tab and the second side tab. The clamping leg of the clamping spring can thus also be symmetrical. The clamping leg can thus be acted upon by the actuation element on both sides of the clamping tab during an actuation process, so that a particularly uniform distribution of force on the clamping leg of the clamping spring can be achieved.

Figure 3:
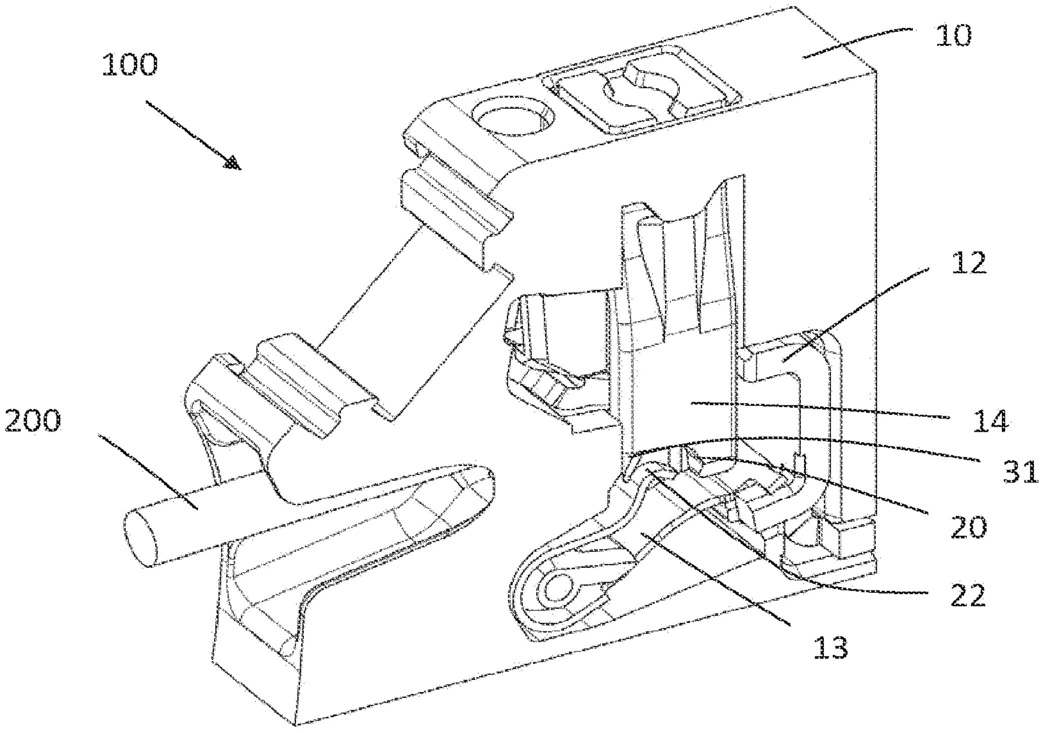
FIG. 3 is a schematic representation of the system shown in FIG. 1 with a connected conductor.
Figure 4:
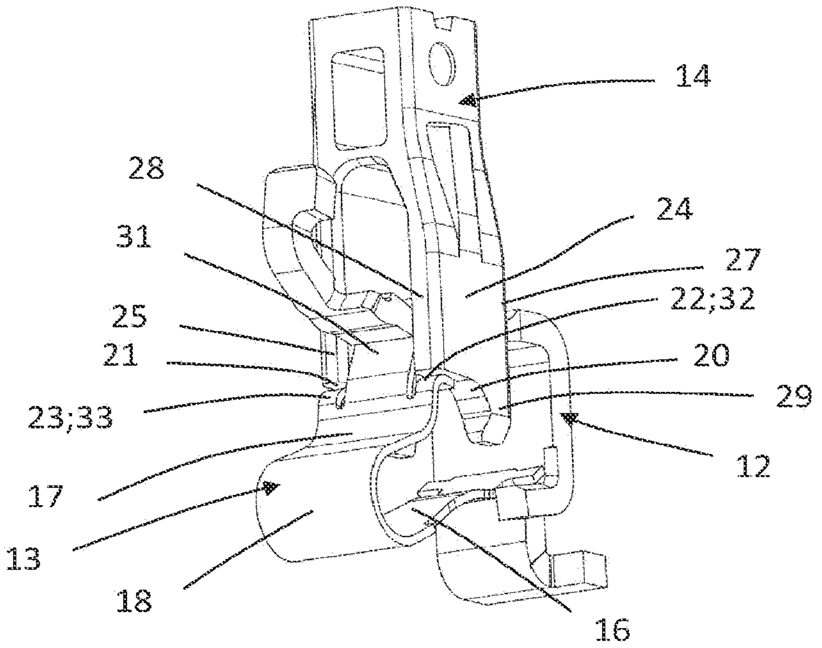
FIG. 4 is a schematic representation of the actuation element, the clamping spring and the current bar of the terminal shown in FIG. 1 in the clamping position of the clamping leg of the clamping spring.

FIGS. 1 to 6 show a terminal 100 for connecting an electrical conductor 200, as shown, for example, in FIG. 3.

The connection terminal 100 has a housing 10, which can be designed as an insulating material housing. The housing 10 has a conductor insertion opening 11, via which the conductor 200 to be connected can be inserted into the housing 10. A current bar 12, a clamping spring 13 and an actuation element 14 for actuating the clamping spring 13 are arranged In the housing 10.

Figure 5:
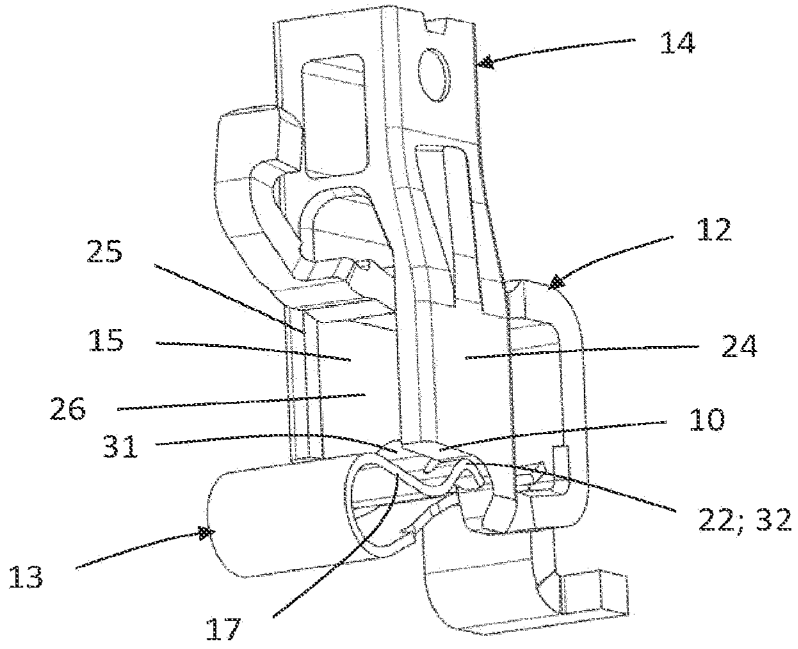
FIG. 5 is a schematic representation of the actuation element, the clamping spring and the current bar of the terminal shown in FIG. 1 in the open position of the clamping leg of the clamping spring.

As can be seen in FIG. 5, where the terminal 100 is shown without the housing 10, a conductor connection space 15 is formed between the current bar 12 and the clamping spring 13, within which a connection and thus a clamping of the conductor 200 takes place.

The clamping spring 13 is designed as a leg spring. It has a retaining leg 16, a clamping leg 17 and a bending joint 18 formed between the retaining leg 16 and the clamping leg 17, as shown in particular in FIG. 4, where the terminal 100 is shown without a housing 10. With the retaining leg 16, the clamping spring 13 is hooked onto the current bar 12 and fastened. The clamping leg 17 is movable, in particular pivotable, relative to the retaining leg 16. The conductor 200 to be connected can be clamped against the current bar 12 by means of the clamping leg 17.

The actuation element 14 is displaceably mounted in the housing 10. A transfer of the clamping leg 17 of the clamping spring 13 from a clamping position, as shown, for example, in FIGS. 1 and 4, into an open position, as shown, for example, in FIGS. 2 and 5, takes place by means of a displacement movement of the actuation element 14, wherein the actuation element 14 is displaced purely linearly in the actuating direction B.

The actuating direction B of the actuation element 14 extends transversely or perpendicularly to an insertion direction E of the conductor 200 into the housing 10.

The actuation element 14 is elongated in shape. On one end face, the actuation element 14 has an actuating face 19, via which the actuation element 14 can be actuated, for example, by means of a tool, such as a screwdriver. On an end face opposite this end face, where the actuation face 19 is formed, the actuation element 14 has a pressure face 20, 21, which interacts with the clamping leg 17 of the clamping spring 13, in order to apply a force from the actuation element 14 onto the clamping leg 17 of the clamping spring 13 and to thus transfer the clamping leg 17 from the clamping position into the open position.

For this purpose, a skid 22, 23 is formed on the clamping leg 17 and interacts with the pressure face 20, 21 of the actuation element 14 in such a way that, during an actuation process, the clamping leg 17 slides with the skid 22, 23 along the pressure face 20, 21.

In the embodiment shown in FIGS. 1 to 6, the actuation element 14 has two pressure faces 20, 21, which run parallel to each other. The clamping leg 17 also has two skids 22, 23, which run parallel to each other.

The pressure face 20, 21 has an arcuate shape, so that the skids 22, 23 describe a curve when sliding along the pressure faces 20, 21.

The actuation element 14 has two actuating arms 24, 25, running parallel to each other, on each of which one of the pressure faces 20, 21 is formed. The two actuating arms 24, 25 are arranged at a distance from each other, so that an opening 26, through which the current bar 12 is guided and through which the conductor 200 to be connected is guided is formed between the two actuating arms 24, 25. The opening 26 forms the conductor connection space 15, wherein the conductor connection space 15 is laterally delimited by the two actuating arms 24, 25. The conducting connection space 15 is delimited upwardly by the current bar 12 and the conductor connection space 15 is delimited downwardly by the clamping leg 17 of the clamping spring 13.

Each of the two actuating arms 24, 25 has a first longitudinal side face 27 and a second longitudinal side face 28 opposite the first longitudinal side face 27. The first longitudinal side face 27 is formed longer than the second longitudinal side face 28, so that the respective actuating arm 24, 25 has a kind of extension lug 29 in the region of the first longitudinal side face 27. The longer first longitudinal side face 27 and thus the extension lug 29 are formed in the region of the clamping edge 30 of the clamping leg 17.

The pressure faces 20, 21 in each case extend between the first longitudinal side face 27 and the second longitudinal side face 28, so that the pressure faces 20, 21 extend over the entire width of the actuating arms 24, 25.

In the embodiment shown in FIGS. 1 to 6, the clamping leg 17 of the clamping spring 13 has a clamping tab 31 and two side tabs 32, 33 in each case formed laterally with respect to the clamping tab 31. In each case one of the two skids 22, 23 is formed on the two side tabs 32, 33. The clamping edge 30, by means of which the conductor 200 to be connected is clamped against the current bar 12, is formed on the clamping tab 31.

The clamping tab 31 is designed to be longer than the two side tabs 32, 33, so that the clamping tab 31 projects beyond the two side tabs 32, 33. The two side tabs 32, 33 and thus the two skids 22, 23 are thus set back from the clamping edge 30 in the direction of the bending joint 18 of the clamping spring 13.

The clamping tab 31 is essentially straight. The two side tabs 32, 33 on the other hand are curved, so that the skids 22, 23 have an arcuate shape. The skids 22, 23 are in each case curved in the direction of the pressure faces 20, 21. The contact point of the skids 22, 23 on the pressure faces 20, 21 of the actuation element 14 is formed at the apex of the curvature or at the apex of the arcuate shape of the skids 22, 23.

Figure 6:
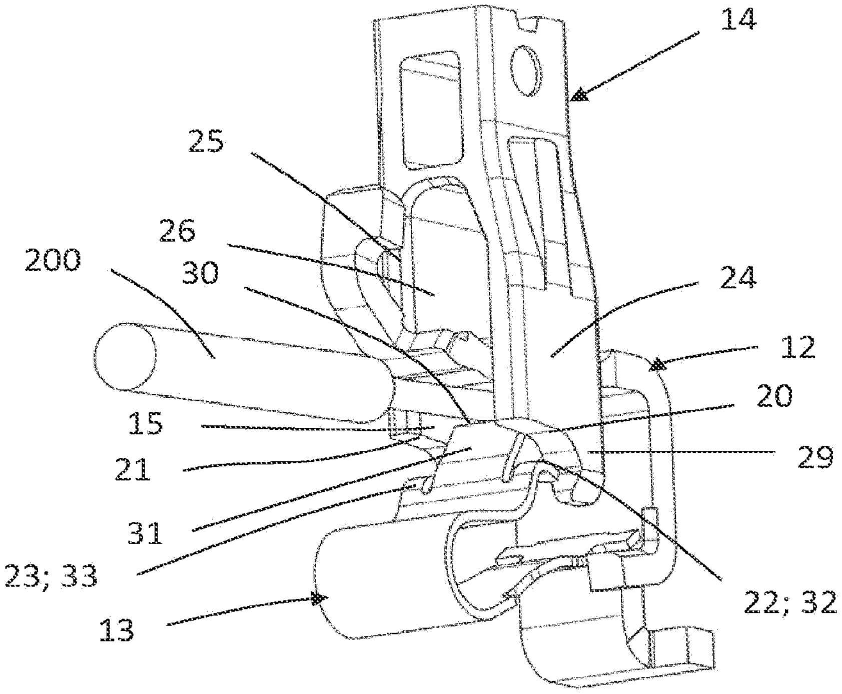
FIG. 6 is a schematic representation of the actuation element, the clamping spring and the current bar of the terminal shown in FIG. 1 with a connected conductor.

If a conductor 200 is inserted into the connecting terminal 100 and clamped to the current bar 12 by means of the clamping spring 13, the skids 22, 23 will be arranged at a distance from the pressure faces 20, 21, as can be seen in FIGS. 3 and 6, so that, while a conductor 200 is being clamped, there will be no contact between the actuation element 14 and the clamping spring 13.

Figure 7:
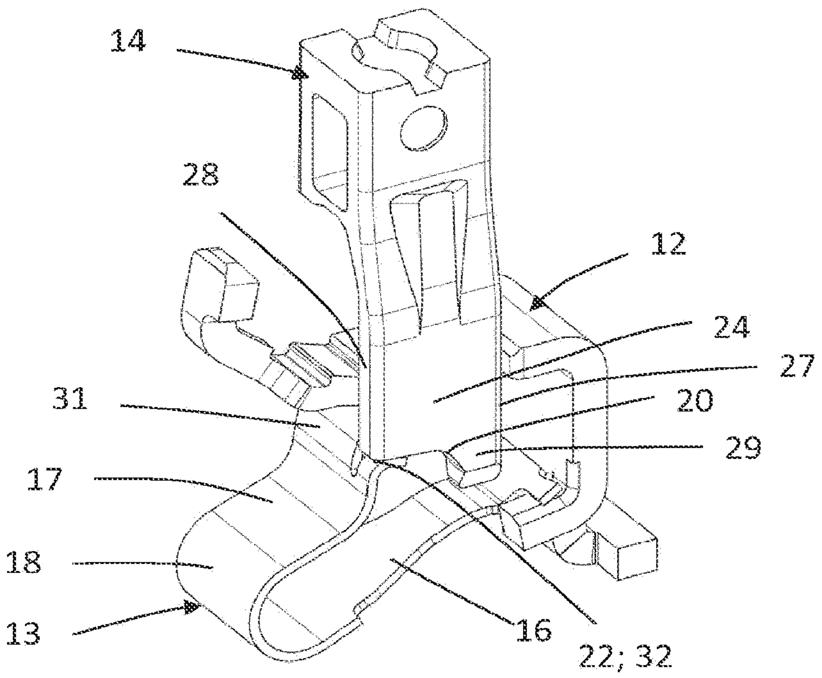
FIG. 7 is a schematic representation of an actuation element, a clamping spring and a current bar according to a further terminal according to the invention with the clamping leg of the clamping spring in the clamping position.
Figure 8:
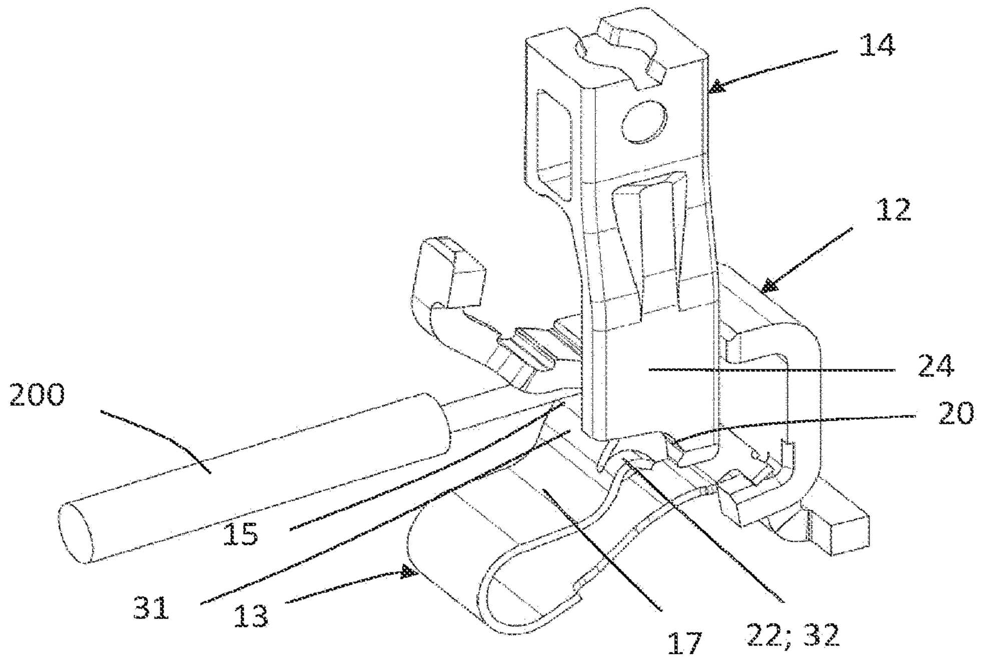
FIG. 8 is a schematic representation of the actuation element, the clamping spring and the current bar according to the embodiment shown in FIG. 7 with a connected conductor.

In FIGS. 7 and 8 an embodiment is shown in which only one skid 22 is formed on the clamping leg 17 of the clamping spring 13 and also only one pressure face 20 is formed on the actuation element 14. The actuation element 14 has only one actuating arm 24 on which the pressure face 20 is formed. The clamping spring 13 has on its clamping leg 17 a clamping tab 31, on which the clamping edge 30, is formed and a side tab 32, on which the skid 22 is formed.

In contrast to the embodiment shown in FIGS. 1 to 6, the actuation element 14 and the clamping leg 17 of the clamping spring 13 are here designed asymmetrically. The mode of operation of the terminal 100 shown in FIGS. 6 and 7 is nevertheless the same as in the case of the terminal 100 shown in FIGS. 1 to 6.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article “a” or “the” in introducing an element should not be interpreted as being exclusive of a plurality of elements. Likewise, the recitation of “or” should be interpreted as being inclusive, such that the recitation of “A or B” is not exclusive of “A and B,” unless it is clear from the context or the foregoing description that only one of A and B is intended. Further, the recitation of “at least one of A, B and C” should be interpreted as one or more of a group of elements consisting of A, B and C, and should not be interpreted as requiring at least one of each of the listed elements A, B and C, regardless of whether A, B and C are related as categories or otherwise. Moreover, the recitation of “A, B and/or C” or “at least one of A, B or C” should be interpreted as including any singular entity from the listed elements, e.g., A, any subset from the listed elements, e.g., A and B, or the entire list of elements A, B and C.

LIST OF REFERENCE SIGNS

100 Terminal
10 Housing
11 Conductor insertion opening
12 Current bar
13 Clamping spring
14 Actuation element
15 Conductor connection space
16 Retaining leg
17 Clamping leg
18 Bending joint
19 Actuating face
20 Pressure face
21 Pressure face
22 Skid
23 Skid
24 Actuating arm
25 Actuating arm
26 Opening
27 First longitudinal side face
28 Second longitudinal side face
29 Extension lug
30 Clamping edge
31 Clamping tab
32 Side tab
33 Side tab
200 Conductor
B Actuating direction
E Insertion direction

The invention claimed is:

1. A terminal for connecting an electrical conductor, the terminal comprising:
a housing;
a current bar arranged in the housing;
a clamping spring arranged in the housing for clamping the conductor to be connected against the current bar in a conductor connection space formed between the current bar and the clamping spring; and
an actuation element, which is displaceably mounted in the housing in a purely linear or a purely translational manner, wherein a clamping leg of the clamping spring is configured to be actuated by the actuation element in order to transfer the clamping leg from a clamping position into an open position,
wherein the clamping leg has at least one skid, which with at least one pressure face formed on the actuation element, interacts during the transfer of the clamping leg from the clamping position into the open position in such a way that the clamping leg slides along the at least one pressure face with the at least one skid,
wherein the clamping leg has a second skid and the actuation element has a second pressure face, and
wherein, when the clamping leg is transferred from the clamping position into the open position, the second skid and the second pressure face interact in such a way that the clamping leg with the second skid slides along the second pressure face.

2. The terminal according to claim 1, wherein at least one pressure face has an arcuate shape.

3. The terminal according to claim 1, wherein the at least one skid has an arcuate shape.

4. The terminal according to claim 1, wherein the clamping leg has a second side tab arranged to the side of the clamping tab,
wherein the second skid is formed on the second side tab,
wherein the clamping tab is arranged between the first side tab and the second side tab.

5. The terminal according to claim 1, wherein the actuation element has at least one actuating arm, wherein the at least one actuating arm delimits the conductor connection space transversely to the insertion direction of the conductor into the conductor connection space, and wherein the at least one pressure face is formed on a side face of the at least one actuating arm facing the clamping spring.

6. The terminal according to claim 5, wherein the at least one actuating arm has a first longitudinal side face, which is longer than a second longitudinal side face opposite the first longitudinal side face, wherein the at least one pressure face extends from the first longitudinal side face to the second longitudinal side face.

7. The terminal according to claim 1, wherein the clamping leg has a clamping tab and at least one side tab arranged to the side of the clamping tab wherein a clamping edge for clamping the conductor to be connected against the current bar is formed at a free end of the clamping tab, and wherein the at least one skid is formed on the at least one side tab.

8. The terminal according to claim 7, wherein the clamping tab projects beyond the at least one side tab in the longitudinal direction of the clamping leg.

9. The terminal according to claim 1, wherein the actuation element has a second actuating arm on which the second pressure face is formed on a side face facing the clamping spring, wherein the first actuating arm and the second actuating arm are arranged opposite each other and each laterally delimit an opening of the actuation element, through which the current bar is guided and the conductor to be connected can be guided.

10. A terminal for connecting an electrical conductor, the terminal comprising:

a housing;

a current bar arranged in the housing;

a clamping spring arranged in the housing for clamping the conductor to be connected against the current bar in a conductor connection space formed between the current bar and the clamping spring; and an actuation element, which is displaceably mounted in the housing in a purely linear or a purely translational manner, wherein a clamping leg of the clamping spring is configured to be actuated by the actuation element in order to transfer the clamping leg from a clamping position into an open position, wherein the clamping leg has at least one skid, which with at least one pressure face formed on the actuation element, interacts during the transfer of the clamping leg from the clamping position into the open position in such a way that the clamping leg slides along the at least one pressure face with the at least one skid, wherein the clamping leg has a second side tab arranged to the side of the clamping tab, wherein a second skid is formed on the second side tab, and wherein the clamping tab is arranged between the first side tab and the second side tab.

* * * * *